United States Patent [19]
Leverton

[11] 3,879,811
[45] Apr. 29, 1975

[54] CONSTRICTIBLE BAND CLIPS

[76] Inventor: Peter Leverton, 2, West St., South Kirkby near Pontefract, England

[22] Filed: May 14, 1974

[21] Appl. No.: 469,799

[52] U.S. Cl. .................. 24/281; 285/253; 24/279
[51] Int. Cl. ............................................ B65d 63/00
[58] Field of Search ............ 24/279, 280, 281, 282; 285/253

[56] References Cited
UNITED STATES PATENTS

| | | | |
|---|---|---|---|
| 2,817,136 | 12/1957 | Zartler | 24/279 |
| 3,579,754 | 5/1971 | Oetiker | 24/279 |

*Primary Examiner*—Bernard A. Gelak
*Attorney, Agent, or Firm*—Wolf, Greenfield & Sacks

[57] ABSTRACT

A constrictible band clip having a flexible band for encircling a hose or pipe comprises a U-shaped saddle or bracket member, an internally screw threaded block bridging the limbs thereof and forming a non-rotatable nut, and an adjuster screw threaded through the nut and extending tangentially to the band, one end of the band being passed between the limbs and having a series of apertures for adjustable engagement with a projection on the saddle base, the other end of the band being passed in the opposite direction between the limbs overlying the first end and forming or being attached to a bearing member to which the nose of the adjuster is rotatably attached. The saddle limbs may have openings or gaps to receive lugs or trunnions of the nut, the nut and adjuster screw may be rockable relative to the saddle in the plane of the band, and the saddle may be readily detachable from the rest of the clip.

5 Claims, 9 Drawing Figures

CONSTRICTIBLE BAND CLIPS

This invention relates to constrictible band clips of the kind having an encircling flexible band and screw means for tightening and slackening the band.

Clips of this nature are widely used for securing flexible hoses to pipe ends or to other fittings, one type which is commonly used and called a "Jubilee" (Trade Mark) clip having the ends of its band overlapping one another and moved relative to one another to tighten or slacken the band by rotating a worm device which is anchored to one end of the band and engages rack teeth formed in the other end of the band. This type of clip, however, is subject to considerable wear because the rack teeth are only engaged by a portion of the screw thread on the worm, usually less than half of the circumference thereof. Also, for the same reason, the purchase or engaging power obtained between the rack teeth and the worm threads is somewhat limited.

The object of the present invention is to provide an improved construction of constrictible band clip of the first abovementioned kind and in particular one which will enable a good purchase or tightening power to be obtained and which is capable of quick and easy adjustment to suit a range of different diameters of hoses or pipes with which it is to be used. Other advantages of clips constructed according to this invention will be explained later in this specification.

A constrictible band clip according to the invention comprises a U-shaped saddle or bracket member with the base curved to fit substantially the circumference of a hose or pipe end, a screw threaded block bridging the limbs of the saddle or bracket member and forming a nut and an adjuster screw threaded through the block and extending approximately tangentially to the circumference of the band, one end of the band being passed between the limbs of the saddle or bracket member and having a longitudinally spaced series of apertures or recesses by which it can be engaged for longitudinal adjustment with a projection formed or mounted on the base of the saddle or bracket member within the boundaries of its limbs, and the other end of the band being passed in the opposite direction between the limbs of the saddle or bracket member and being formed with or having secured thereto a bearing member to which the nose of the adjuster screw is rotatably attached, this latter end portion of the band passing close above said projection to hold the first mentioned end portion of the band in engagement with the projection.

In order that the invention may be more fully understood a clip constructed according thereto and modifications thereof will now be described, by way of example, with reference to the accompanying drawings, wherein.

Figure 1:
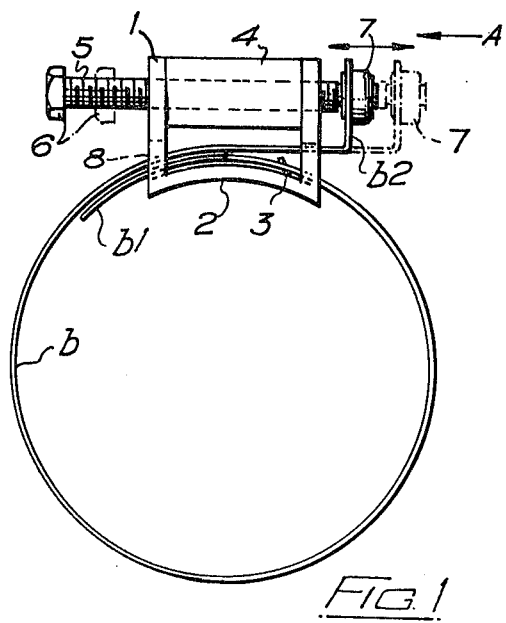
FIG. 1 is an elevation of a clip according to the invention.
Figure 2:
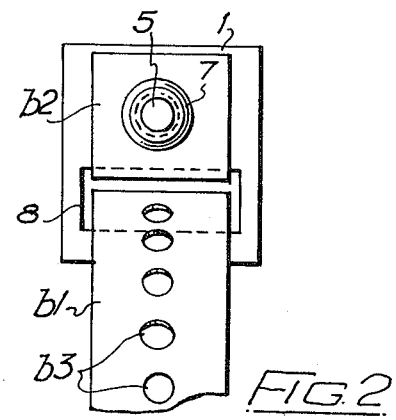
FIG. 2 is a view on an enlarged scale seen in the direction of arrow A in FIG. 1 but omitting the body of the band.

Referring first to the clip shown in FIGS. 1 and 2 of the accompanying drawings, which is intended for use as a hose clip, a saddle or bracket member 1 is bent or cast to U-shape with the base 2 curved to fit substantially the circumference of a hose or pipe end. From the base an anchor prong 3 projects substantially radially outwards within the boundaries of the saddle limbs. The limbs of the saddle lie in planes at right angles to the general plane in which the band lies and are bridged by a screw threaded block 4 forming a nut and this may be formed with the saddle or separate from and secured to the saddle. Through the block and the saddle limbs is threaded an adjuster screw 5 with a head 6 by which it can be turned using a spanner or box key, the screw extending approximately tangentially to the circumference of the band $b$.

The band has its two ends passed between the saddle limbs through slotted guides 8, extending between the saddle base 2 and the block 4 so as to overlap one another. The tail end $b1$ is formed with a longitudinally spaced series of apertures or recesses $b3$ any one of which can be engaged with the anchor prong 3 to anchor that end to the saddle. The head end $b2$ is formed with or has secured thereto a bearing member 7 to which the nose of the adjuster screw 5 is rotatably attached so that rotation of the adjuster will tighten or slacken the clip, as indicated by the double-headed arrow and by the dot-and-dash lines. Either the screw 5 or the block 4 may embody self-locking of "shake proof" means to prevent slackening of the clip.

The slotted guides 8 retain the overlapping portions of the band in close proximity to one another with the head end $b2$ passing close above the prong 3 whilst permitting the necessary relative longitudinal sliding movement between said overlapping portions.

To adjust this form of hose clip for a smaller range of diameters than can be achieved by the maximum extent of screw tightening, the tail end $b1$ is pushed further through the saddle and re-engaged by one of the apertures $b3$ with the prong 3 on which it is held by the head end when the band is tensioned. This not only enables one size of clip to suit a wider range of hose diameters than is at present customary, but it permits of an easy initial rapid adjustment of the anchorage position when applying the clip to a hose to reduce the amount of screwing up of the adjuster screw.

Alternative forms of projection and recesses or apertures may be used for anchoring and adjusting the tail end of the band. For example, a captive ball may be engaged by one of the apertures or recesses $b3$, or a prong may be mounted on an arm pivoted on the saddle and may be so located between the two overlapping portions of the band that tightening of the band presses the prong into the selected aperture or recess.

Figure 3:
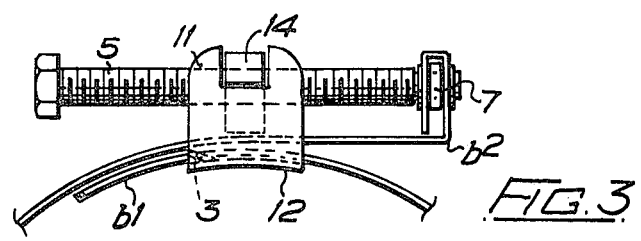
FIG. 3 is a view similar to that shown in FIG. 1 but of a clip having a modified form of bracket member and screw-threaded block, but omitting the body of the band.
Figure 6:
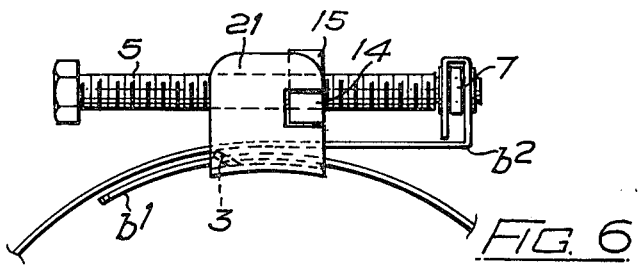
FIG. 6 is a view similar to FIG. 3 but showing a further modification of the bracket member.

In the modifications shown in FIGS. 3 and 6, like parts to those shown in FIGS. 1 and 2 are indicated by like reference numerals and letters.

Figure 4:
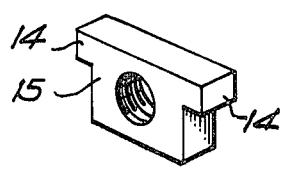
FIGS. 4 and 5 are perspective views respectively of the block and bracket member shown in FIG. 3.
Figure 5:
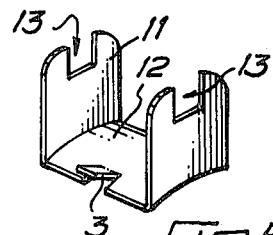

In the construction shown in FIGS. 3 to 5, the U-shaped saddle or bracket member 11 has its limbs arranged parallel to the longitudinal axis of the adjuster screw 5 instead of at right angles thereto as in FIG. 1, but its base 12 is appropriately curved. Gaps 13 or jaws are formed in the ends of its limbs to receive two trunnion-like lugs 14 of the screw threaded block 15 when this is located between the limbs, the lugs preferably making a loose fit in the gaps to allow the block to rock in the saddle and thereby permit some accommodating movement to take place in the angle in the plane of the band at which the screw 5 lies in the saddle in order to assist in tending to keep the screw substantially tangential to the circumference of the band $b$ under varying conditions. In these Figures the anchor prong 3 is located near the opposite side of the saddle base to that shown in FIG. 1 but still projecting in the same general direction. As will be seen from the drawings this results in the head-end portion of the band passing very close over the prong to retain the tail end of the band in engagement with the prong. Also in FIG. 3 the head end $b2$ of the band is shown as being bent around the bearing member 7 to hold it against rotation and to reinforce this end.

Figure 7:
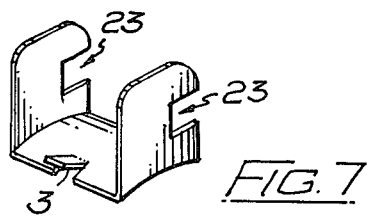
FIG. 7 is a perspective view of the bracket member shown in FIG. 6.

In the modification shown in FIGS. 6 and 7, the only difference is in the form of the saddle or bracket member 21 and the orientation of the block 15 shown in FIG. 4. The saddle 21 is the same shape as the saddle 11 but the gaps or jaws 23 are formed in the sides of the saddle limbs nearest to the head end $b2$ of the band and are engaged by the lugs 14 of the block 15 which is now inverted relative to its position in FIG. 3. This construction of clip operates in a similar manner to that already described.

Figure 8:
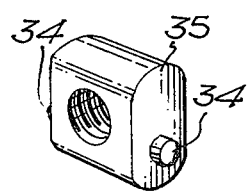
FIGS. 8 and 9 are perspective views respectively of a further modified form of the block and bracket member.
Figure 9:
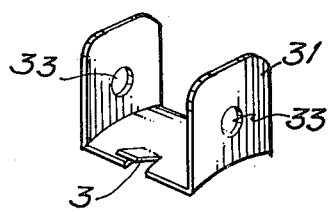

In the modification shown in FIGS. 8 and 9, the saddle or bracket member 31 has circular bearing holes 33 in its limbs to receive with an easy fit cylindrical trunnions 34 of a screw threaded block 35 to enable the block to rock in the saddle, the lower face of the block being rounded to clear the two overlapped end portions of the band. This again permits some accommodating rocking movement of the adjuster screw 5 as previously explained, which also helps to reduce wear and strain on the screw thread and on the bearing member 7 and its holding means by directing the clip-tightening and holding force along longitudinal axis of the ajuster screw. As a further modification on the above construction, the bearing holes in the limbs and the lugs on the block could be rectangular with or without the provision for rocking movement.

An added advantage of the constructions of clip shown in FIGS. 3 to 7 is that the saddle or bracket member and the screw threaded block are readily separable from one another. This means that, with the saddle removed, the band can be opened out to separate its two ends and can then be placed around a hose or pipe in circumstances where there is no access to a free end of the hose or pipe for slipping the overlapped band of the clip over the hose or pipe end as is the usual procedure.

The head of the screw 5 may be adapted for turning by a screw driver instead of by a spanner or box key.

I claim:

1. A constrictible band clip having an encircling flexible band and means for tightening and slackening said band, said clip comprising in combination a U-shaped bracket member having its base curved to fit substantially the circumference of a pipe when fitted thereon with its limbs parallel to and extending on opposite sides of said band, said limbs having a pair of opposed openings, a projection on the base of said bracket member within the boundaries of its limbs, an internally screw threaded block bridging the limbs of said bracket member and locatable therein by engagement of extension portions on said block in said openings, said block constituting a non-rotatable nut, an adjuster screw threaded through said block and extending approximately tangentially to the circumference of said band, a first end portion of the band being passed in one direction between the limbs of said U-shaped bracket member and having a longitudinally spaced series of apertures or recesses by which it can be engaged for longitudinal adjustment with said projection on the base of the bracket member, and the opposite end portion of said band being passed in the opposite direction between said limbs and overlying said first end portion and carrying a bearing member to which the nose of said adjuster screw is rotatably attached, said opposite end portion of the band passing close above said projection for holding said first end portion of the band in engagement with said projection when said band is tensioned.

2. A constrictible band clip as claimed in claim 1, wherein said openings are constituted by gaps located in the ends of said limbs opposed to the base of said bracket member, the engagement of said extension portions of said nut in said gaps being sufficiently loose to enable the nut and adjuster screw to rock in the plane of the band.

3. A constrictible band clip as claimed in claim 1, wherein said openings are constituted by gaps located in the sides of the limbs nearest to said opposite end portion of the band, the engagement of said extension portions of said nut in said gaps being sufficiently loose to enable the nut and adjuster screw to rock in the plane of the band.

4. A constrictible band clip as claimed in claim 1, wherein said openings are constituted by circular bearing holes and said extension portions of the nut are in the form of cylindrical trunions freely engageable in said holes to enable the nut and adjuster screw to rock in the plane of the band.

5. A constrictible band clip as claimed in claim 2 or claim 3, wherein the engagement of said nut in said bracket member is so arranged that the bracket member is readily detachable from the rest of the clip.

* * * * *